Oct. 11, 1949.　　　　T. E. KLEIN　　　　2,484,297
APPARATUS FOR FREEZING FOOD
Filed Feb. 20, 1946
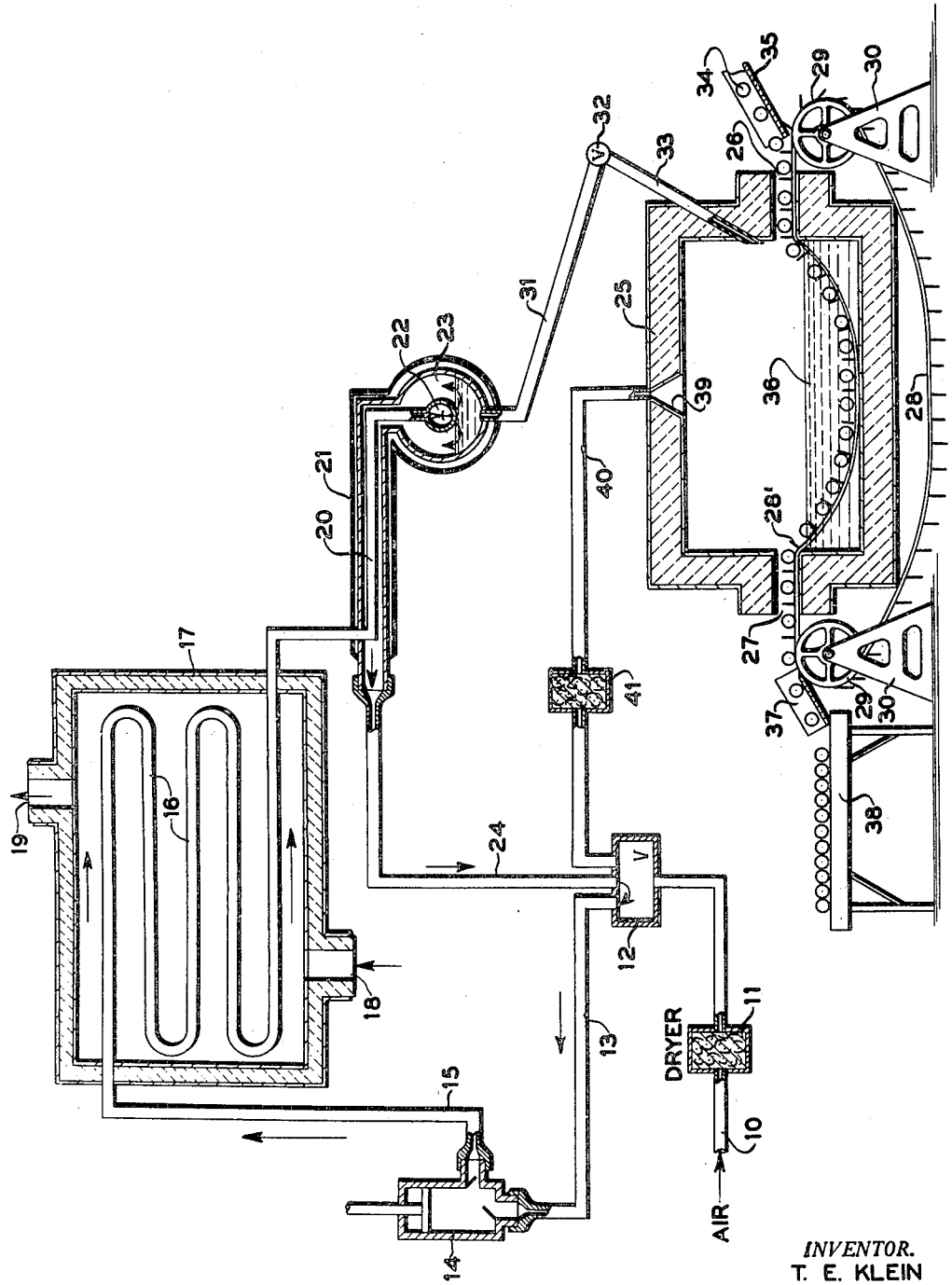
INVENTOR.
T. E. KLEIN
BY
ATTORNEY Patented Oct. 11, 1949

2,484,297

UNITED STATES PATENT OFFICE 2,484,297

APPARATUS FOR FREEZING FOOD

Theodore E. Klein, Cranford, N. J.

Application February 20, 1946, Serial No. 648,926

2 Claims. (Cl. 62—104)

This invention relates to refrigeration, and more particularly to the preservation, of comestibles including fresh fruits and vegetables, and particularly those in which it is desirable to retain the vitamin content.

Heretofore processes of preservation have been employed which have not reached the degree of satisfaction desired and particularly in the preservation of certain fruits and vegetables, as for example, the juice of citrus fruits, etc. Many food products including fresh fruits and vegetables have been quick frozen and thus preserved in a manner to be served with their freshness and palatability retained. Juices have been preserved by canning and certain of these juices have been found to retain their original vitamin content. However, it has not been possible to preserve the fresh juice of citrus fruits.

It is an object of the present invention to preserve the fresh juice of citrus fruits with their vitamin content retained.

In accordance with the present invention, fresh fruit juices are preserved by intimate contact with liquid air so that flash freezing results and the vitamin content of the juice is retained. It is well known that the critical temperature for air is —220° F. and that at atmospheric pressure liquid air boils at a temperature of approximately —317° F.

Further objects and advantages of the invention will be apparent from the following description taken in conjunction with the accompanying drawings, wherein:

The figure is a diagrammatic view with certain of the parts in section illustrating one application of the invention.

Referring to the drawings, air is liquefied in a refrigeration system and by means of the liquid air fruit juice or other material is frozen, either in containers or not depending upon the nature of the product.

The refrigeration system for producing liquid air comprises an inlet pipe 10, preferably including a drier 11, such pipe leading to a four-way valve 12 from which, through a pipe 13, the air is conducted to a compressor 14 where its volume is reduced or compressed.

Compressed air from the compressor flows through the pipe 15 into a cooling coil 16 located in an insulated brine tank 17. The brine tank has an inlet 18 and an outlet 19 for the cooling fluid.

Air cooled in the cooling coil 16 flows through the pipe 20, disposed concentrically of an outer pipe 21, and such air is discharged through a throttle valve 22 into a collection receptacle or receiver 23.

When the cooled air is discharged through the throttle valve 22 to the collection receptacle 23 some of the air will be liquefied such liquid collected in the bottom of receptacle with the remaining gas passing out through the pipe 21 thereby cooling the air coming in through the pipe 20.

The concentric pipes 20 and 21 form a heat exchanger, although the relative arrangement of the pipes is unimportant other than they are associated sufficient only to provide the necessary heat exchanger between the incoming and outgoing gases. The air or vapor discharged through the pipe 21 from the collector 23 passes through the pipe 24 to the four-way valve 12 and returns through the pipe 13 to the compressor 14 for the start of another cycle. The refrigeration system above described may be varied in accordance with requirements or to suit the desired need.

In order to provide apparatus by means of which intimate contact between the material to be frozen and the liquid air may be accomplished, a structure for purposes of illustration only may include a heavily insulated freezing receptacle 25 having an inlet 26 for material to be frozen and an outlet 27 for the frozen material.

In order to provide means for carrying the material through the container an endless belt 28 may be employed such belt being supported on pulleys 29 mounted on supports 30. The belt 28 is constructed of a material which is usable and operative at extremely low temperatures, such as metal or the like. It is necessary that the joints between the various links of the belt provide sufficient clearance so that operation thereof is not constricted as a result of contraction at the low temperatures specified.

The freezing medium in the form of liquid air is taken from the receiver or collection receptacle 23 through an insulated pipe 31, a control valve 32 and an insulated pipe 33 discharging directly into the freezing chamber.

As shown in the drawing, containers 34 of material to be frozen are deposited on the chute 35 so that they gravitate onto the endless belt 28 and are carried into intimate contact with the body of liquid air 36 in the container and are thus frozen by this intimate contact which for the purpose of illustration is immersion, although other manner of intimate contact may be employed. The receptacles with the frozen material are discharged by means of a chute 37 onto a table 38 for packing or other use.

The belt 28 is preferably provided with cleats 28' or other means so that the material will be carried along by the belt.

In the freezing chamber intimate contact between matter to be frozen and the liquid air imparts sufficient heat to the liquid air to vaporize a portion of the same and this vapor is preferably returned by an outlet 39 connected by a pipe 40 to the four-way valve 12, a drier 41 preferably being incorporated to remove moisture from the vapor due to leakage or infiltration of outside air into the freezing chamber.

The cleats 28' and likewise the belt 28 are preferably of material to withstand the temperature to which it is subjected in the freezing chamber, such as metal or other metallic material. Instead of passing the material to be frozen through a body of liquid it may be carried along the surface of the liquid.

Also, intimate contact between the material to be frozen and the liquid air may be accomplished in any other desired manner.

While the cooling tank 17 and the cooling chamber 25 are shown insulated, and likewise vacuum insulation is employed around the pipes 21 and the receptacle 23, the other pipes of the system are likewise preferably insulated to exclude heat infiltration.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:
1. A refrigeration system for the preservation of food products and the like comprising apparatus for liquefying air, an insulated chamber for receiving liquid air from said apparatus, means connecting said apparatus to said chamber, a conveyor extending through said chamber for bringing the food products into said chamber and into intimate contact with said liquid air in order that heat may be rapidly abstracted from said products and the temperature thereof reduced and for removing said products from said chamber.

2. A refrigeration system for the preservation of food products and the like comprising apparatus for liquefying air, an insulated chamber for receiving liquid air from said apparatus, means connecting said apparatus to said chamber for receiving the liquid air, conduit means from the chamber to the apparatus for conducting gaseous air from the chamber to the apparatus whereby air evaporating in said chamber may be recirculated through the apparatus, means for conveying food products into said chamber and into intimate contact with said liquid air in order that heat may be rapidly abstracted from said products and the temperature thereof reduced, and means for removing said products from said chamber.

THEODORE E. KLEIN.

REFERENCES CITED

The following references are of record in the file of this patent:

UNITED STATES PATENTS

| Number | Name | Date |
| --- | --- | --- |
| 820,442 | Scheele | May 15, 1906 |
| 1,898,758 | Bottoms | Feb. 21, 1933 |
| 1,944,857 | Atwell | Jan. 23, 1934 |
| 2,083,407 | Scrantom | June 8, 1937 |
| 2,137,902 | Walter | Nov. 22, 1938 |

OTHER REFERENCES

"Liquid Air Oxygen Nitrogen," by George Claude, 1913, printed by J. A. Churchill, 7 Great Marlborough St., London, pages 68 and 247.